United States Patent [19]
Udd

[11] Patent Number: 5,402,231
[45] Date of Patent: Mar. 28, 1995

[54] DISTRIBUTED SAGNAC SENSOR SYSTEMS

[75] Inventor: Eric Udd, Huntington Beach, Calif.

[73] Assignee: McDonnell Douglas Corporation, Huntington Beach, Calif.

[21] Appl. No.: 934,718

[22] Filed: Aug. 24, 1992

[51] Int. Cl.⁶ .................................. G01B 9/02
[52] U.S. Cl. ........................ 356/350; 356/345
[58] Field of Search ............... 356/345, 349, 350; 250/227.19, 227.27; 385/12

[56] References Cited

U.S. PATENT DOCUMENTS

| | | | |
|---|---|---|---|
| 4,639,138 | 1/1987 | Martin et al. | 356/350 |
| 5,146,292 | 9/1992 | Buehler et al. | 356/350 |

Primary Examiner—Samuel A. Turner
Assistant Examiner—Robert Kim
Attorney, Agent, or Firm—Pillsbury Madison & Sutro

[57] ABSTRACT

Wavelength division multiplexed Sagnac distributed sensor systems that allow the determination of the position and amplitude of a frequency dependent environmental effect acting on the optical path of Sagnac loops. The sensor includes two Sagnac interferometers operating at different wavelengths and having optically spaced combining couplers and optical loops which include as portions thereof, the optical path. The outputs of the Sagnac interferometers are summed to determine the relative amplitude of the sensed effect and compared to determine its position on the optical path.

52 Claims, 5 Drawing Sheets

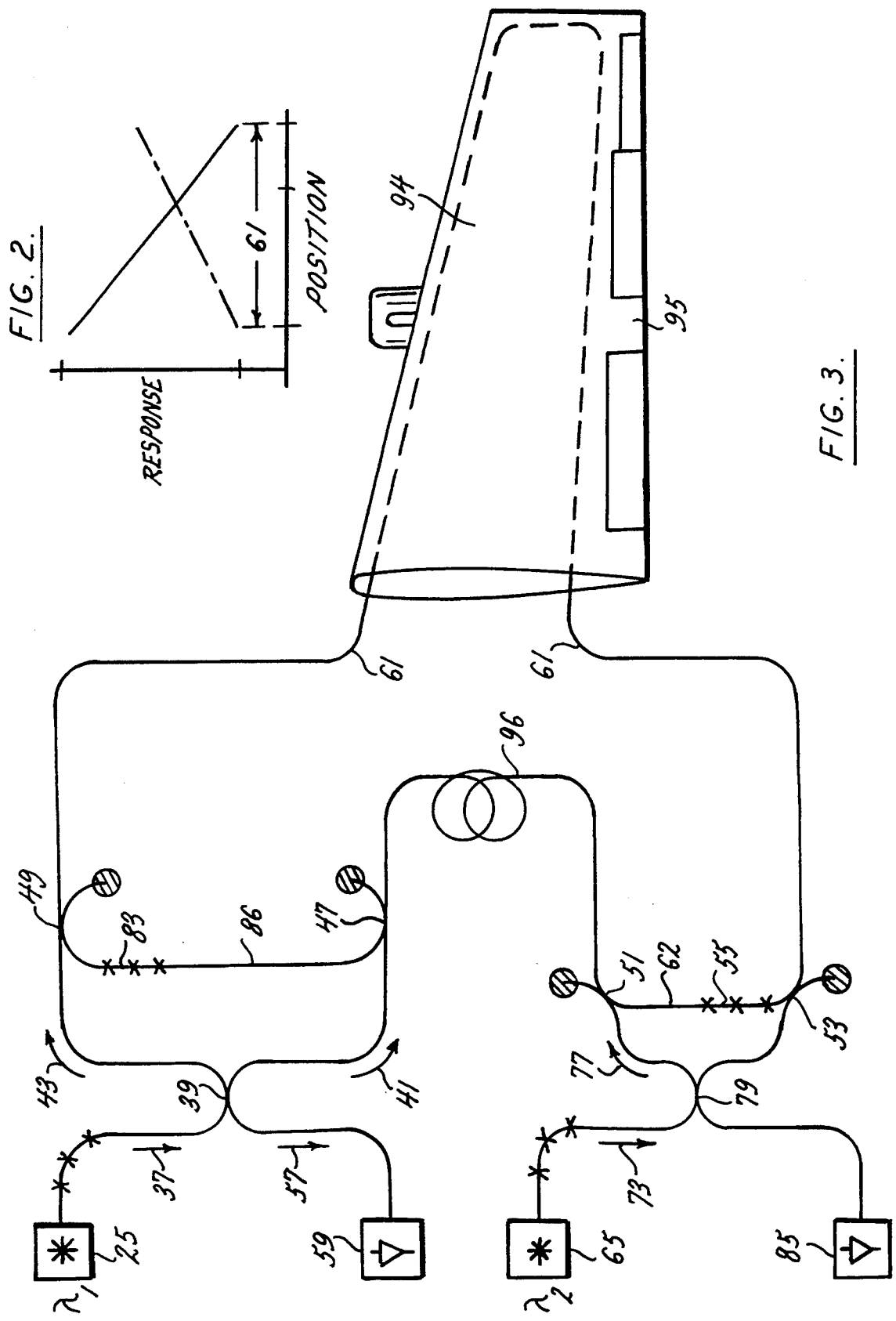

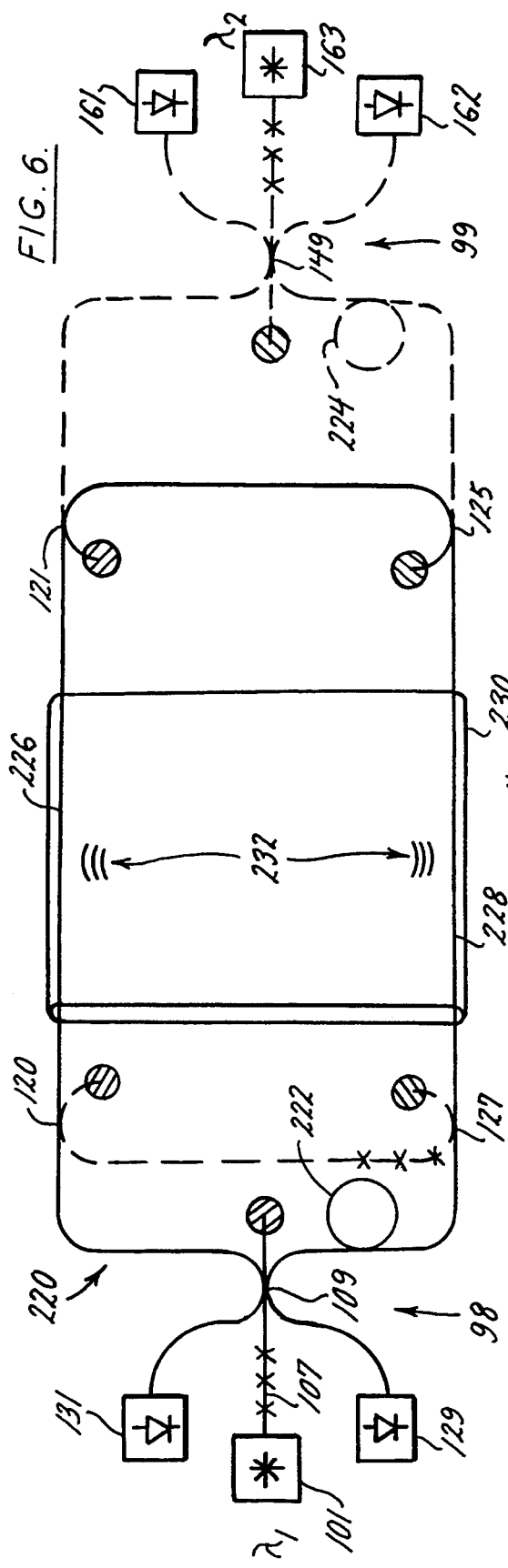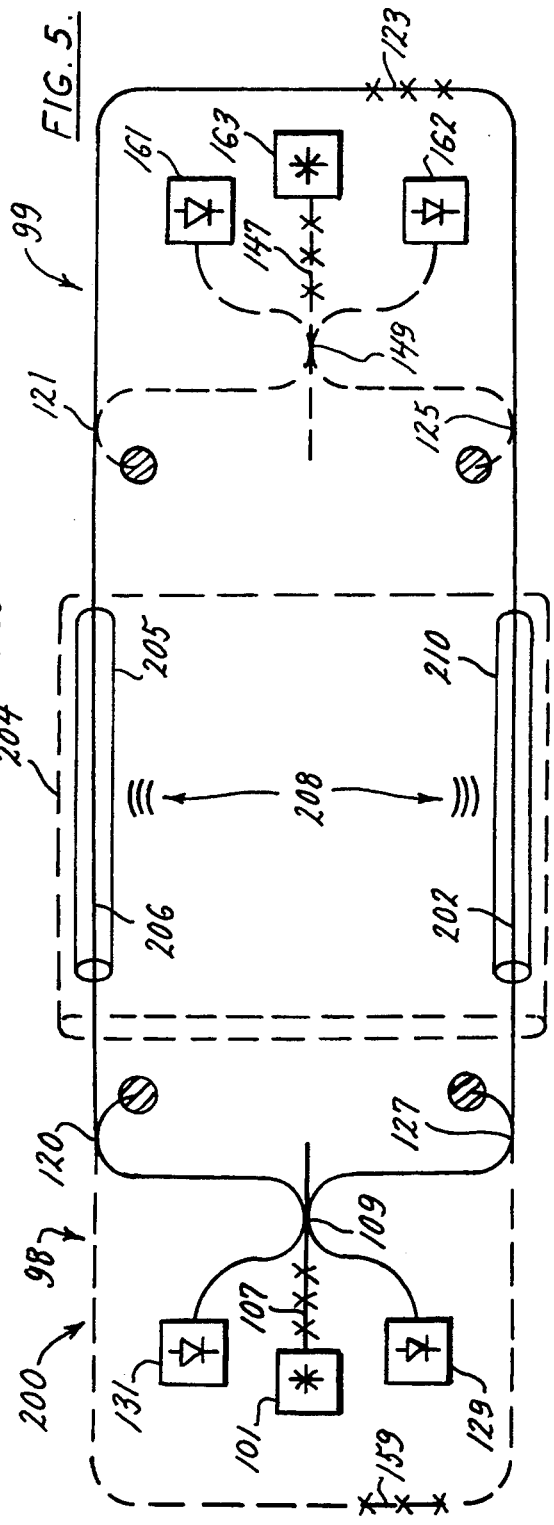

DISTRIBUTED SAGNAC SENSOR SYSTEMS

BACKGROUND OF THE INVENTION

In many applications, such as aerospace structures, it is desired to include a sensor system distributed along the structure to enable position and magnitude sensing of environmental effects in real time. This allows active damping of space structures and load monitoring and alleviation of aircraft structures to be built. The use of optical fibers as sensing elements is particularly desirable as they are light, tough and can be placed in or on a structure with a minimum of cost and degradation. These applications are discussed by E. Udd, in, "Fiber Optic Smart Structures", *Fiber Optic Sensors: An Introduction for Engineers and Scientists* edited by E. Udd, Wiley, (1991). Dakin et al in, "A Novel Distributed Optical Fibre Sensing System Enabling Location of Disturbances in a Sagnac Loop Interferometer", *SPIE* Vol. 838 *Fiber Optic and Laser Sensors V* (1987) pp. 325-326, describes a distributed fiber optic sensor based on the combination of a Sagnac interferometer and a Mach-Zehnder interferometer. The Sagnac interferometer has a position dependent response as described by E. Udd in, "Acoustic Sensor Based on the Sagnac Interferometer", *Proceedings of SPIE*, Vol. 425, 1983, pp. 90-95. Dakin et al showed that by combining the output of the Sagnac interferometer in response to a frequency dependent environmental effect along with the response of a Mach-Zehnder interferometer (see A. Dandridge, "The Mach-Zehnder and Michelson Interferometer" in *Fiber Optic Sensor and Introduction for Engineers and Scientists*, edited by E. Udd, Wiley (1991)) and normalizing the result, the position and location of a frequency dependent environmental effect along an optical fiber could be determined.

One of the major disadvantages of the Dakin et al approach is that the requirements on the light source for optimum performance of a Mach-Zehnder and Sagnac interferometer are diametrically opposed. Specifically, a high performance Mach-Zehnder interferometer needs a long coherence length light source that is often very susceptible to feed back while the Sagnac interferometer performs best with a low coherence length light source. While it is possible to reduce these problems by redesigning the Dakin et al distributed sensor using wavelength division multiplexing techniques and an isolator, it is also possible to design a distributed sensor based solely on the Sagnac interferometer as described by E. Udd in U.S. Pat. Nos. 4,898,468, 4,976,507 and 5,046,848.

BRIEF DESCRIPTION OF THE PRESENT INVENTION

The present invention uses dual Sagnac interferometers operating in conjunction with one another on separate and distinct wavelengths to form a distributed sensor that can determine the position and amplitude of a frequency dependent environmental effect acting on an optical path that is common to the optical loops of the two Sagnac interferometers. The interferometers of the distributed sensor have optically spaced combining couplers that preferably are at opposite ends of the optical path.

A simple Sagnac interferometer includes a light source whose output light beam is passed through an optical splitter and propagated about an optical loop in opposite directions. Upon return, the beams are recombined so that the intensity of the combined beam depends on the relative phases of the two beams as they combine at the splitter. When an environmental effect, such as an acoustic wave, acts at a point a distance z along the optical loop, it produces phase modulation of the two beams which arrive progressively more out of phase at the splitter, the further distant the environmental effect is from the midpoint of the optical loop. This change in phase causes a proportional fringe shift dependent on the position and amplitude of the environmental effect on the optical path of the Sagnac loop, which can be converted by a detector into an electrical signal for further processing. A second Sagnac loop is operated in conjunction with the first Sagnac loop at a second wavelength so that the second loop in operated independently from the first, but shares a common optical path. The two Sagnac interferometers are arranged so that the outputs thereof vary in opposite directions with position of the effect, so that the outputs can be summed to determine the relative amplitude of the sensed effect and compared to determine its position on the optical path. Although slowly varying effects can be sensed, the system works best with rapidly varying environmental effects such as acoustics and vibrations. The resulting distributed sensor has applications in the field of fiber optic smart structures and also can be used to secure fiber optic communications. In the latter case, the sensor can be "piggy backed" on a communications link and be used to sense movement of the link or other effects indicative that someone is trying to tap into it to interfere or intercept communications thereon.

BRIEF DESCRIPTION OF THE DRAWINGS

FIG. 2 is a graph of response vs. length of the optical sensor path for both of the interferometers of FIG. 1;

FIG. 3 is a diagram of the basic wavelength division multiplexed Sagnac distributed sensor of FIG. 1 configured to sense variations in strain in an aircraft wing;

FIG. 5 is a diagram of a modified wavelength division multiplexed distributed Sagnac sensor using fiber coating techniques to optimize sensitivity;

FIG. 6 is a diagram of a modified sensor system using offset fiber coils to optimize sensitivity of the secure link.

DETAILED DESCRIPTION OF THE INVENTION

Figure 1:
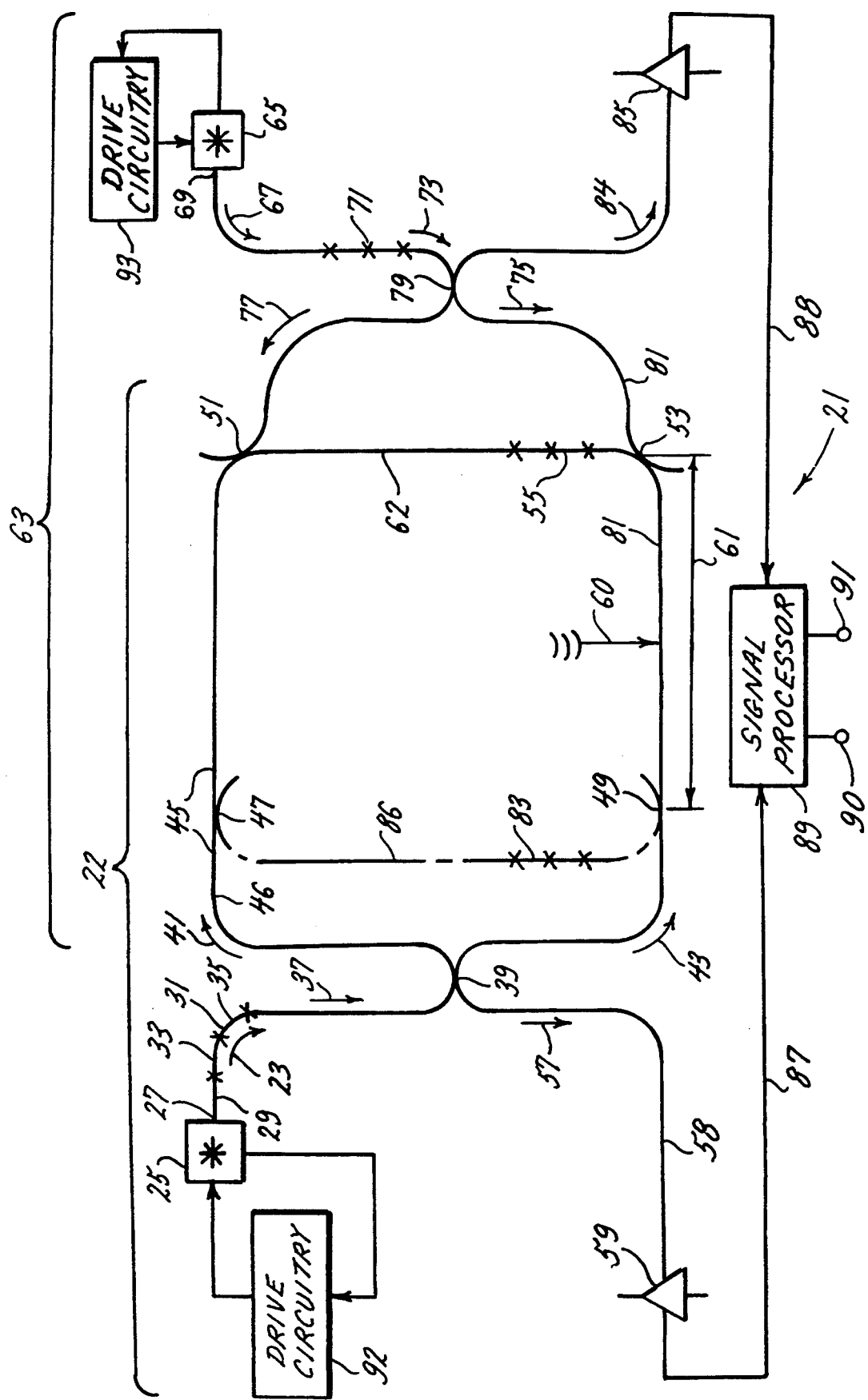
FIG. 1 is a diagram of a basic wavelength division multiplexed Sagnac distributed sensor.

Referring to the drawings more particularly by reference numbers, number 21 in FIG. 1 refers to a basic wavelength division multiplexed Sagnac distributed sensor system 21 including a first Sagnac sensor 22. In the sensor 22, light 23 from a light source 25 operating at a center wavelength $\pi_1$, is coupled into the end 27 of an optical fiber 29. The light source 25 may be a spectrally broad based light source such as a light emitting diode or laser diode. After entering the fiber 29, preferably the light 23 is has its polarization scrambled by an intensity maintenance device 31 so that the magnitude of the light 23 is not severely reduced by random polarizations throughout the sensor 22. The intensity maintenance device 31 shown is a Lyot fiber depolarizer consisting of two lengths 33 and 35 of bifringent polarization preserving fiber, having stretched glass, with the major axes thereof spliced at 45° with respect to each other. The use of the depolarizer 31 enables the use of conventional single mode fiber rather than polarization preserving fiber throughout, lowering the cost of the sensor 22.

The depolarized light beam 37 then enters a fiber optic coupler 39 where it is split into clockwise and counterclockwise propagating light beams 41 and 43. The coupler 39 is connected to a first Sagnac loop 45 constructed from optical fiber 46 which includes, along its length, two spaced pairs of wavelength division multiplexers 47 and 49, and 51 and 53, and a second fiber depolarizer 55 positioned between the pair of wavelength division multiplexers 51 and 53. The clockwise light beam 41 circulates about the Sagnac loop past the wavelength division multiplexers 47 and 51, the fiber depolarizer 55, and the wavelength division multiplexers 53 and 49 before returning to the coupler 39. The counterclockwise light beam 43 circulates in the opposite direction about the Sagnac loop fiber 46 passing through the wavelength division multiplexers 49 and 53, the fiber depolarizer 55, and the wavelength division multiplexers 51 and 47 and returns to the coupler 39. The clockwise and counterclockwise light beams 41 and 43 interfere with each other at the coupler 39 to form a combined light beam 57. If the light beams 41 and 43 are in phase with respect to each other, the combined light beam 57 is directed by the coupler 39 toward the light source 25. If the light beams are 180° degrees out of phase, all of the combined light beam 57 is directed by the coupler 39 toward a detector 59.

When a frequency dependent environmental effect, such as a vibrational stressing, acts on a optical fiber section 61, in this case located between multiplexers 49 and 53 of the Sagnac loop 45, it induces an optical path length modulation locally in the optical fiber section 61 at that frequency. The amplitude of the resulting oscillation depends on the strength of the environmental effect and the response of the optical fiber section 61 to it. The response of the Sagnac sensor 22 to the environmentally induced oscillation depends on the position of the frequency dependent environmental effect and its amplitude. If the effect occurs near the wavelength division multiplexers 51 and 53, which is close to the center of the Sagnac loop 45, both the clockwise and counterclockwise propagating light beams 41 and 43 arrive nearly simultaneously and the induced phase difference between the two beams moves toward zero. As the frequency dependent environment effect acts on a portion of the Sagnac fiber 46 closer to the coupler 39, the difference in arrival time between the clockwise and counterclockwise propagating light beams increases and as long as the frequency of the environmental signal is small compared to the characteristic frequency $f_{cl}$ of the Sagnac loop 45 ($f_{cl}=c/Ln$ where c is the speed of light in vacuum, L is the length of the loop and n is the index of refraction) the amplitude of the resultant signal on the detector 59 will increase linearly.

The response of sensor 22 to a position dependent environmental effect is shown as a solid line on the graph of FIG. 2.

A second Sagnac interferometer is set up to act as sensor 63 in a similar manner. A light source 65 produces light 67 at a center wavelength $\lambda_2$ that is separable by the wavelength division multiplexers 47 and 49, and 51 and 53, from light from the light 23 of source 25 operating at $\lambda_1$. The light 67 from the source 65 is coupled into a fiber end 69 and depolarized by a depolarizer 71 similar to depolarizer 31. The output light 73 whose polarization is scrambled is split into clockwise and counterclockwise beams 75 and 77 by a coupler 79. The beams 75 and 77 are coupled into the Sagnac fiber loop 45 by the wavelength division multiplexers 51 and 53 and circulate around the Sagnac loop 81 of the second Sagnac interferometer by means of the wavelength division multiplexers 47 and 49 between which the light beams 75 and 77 are cross coupled through a third fiber depolarizer 83 and through wavelength division multiplexers 51 and 53 to fiber coupler 79. The light beams 75 and 77 interfere and are directed toward the light source 65 or a second detector 85 dependent upon whether they are in phase or 180° out of phase, respectively.

The response of sensor 63 to a position dependent environmental effect is shown in dashed line on the graph of FIG. 2. As can be seen, it is the reverse of the response of sensor 22 although the magnitudes from the sensors may be different.

The signal outputs 87 and 88 from the detectors 59 and 85 of sensors 22 and 63 from the frequency dependent environmental effect are fed into a signal processor 89. The sum of the signal outputs 87 and 88 from the detectors 59 and 85 is then used to produce signal on an amplitude output 90 representative of the amplitude of the frequency dependent environmental effect and the ratio between the signal outputs 87 and 88 from the detectors 59 and 85 is used to measure its location on the loops 45 and 81, which should be somewhere on the optical fiber section 61. In order to assure the light sources 25 and 63 do not add excess noise to the system 21, they are stabilized via the drive circuitry 92 and 93.

The system 21 is shown in FIG. 3 arraigned with physically adjacent sensors 22 and 66 whose common sensing section 61 is embedded in the skin of an aircraft wing 95. Any flexure of the wing 95 results in strain in the skin 94 and the fiber section 61, whose location and magnitude can be determined with the sensor system 21. Preferably, the length of the fiber section 96 between the multiplexers 47 and 51 is similar to the length of the fiber section 61, although offsets can be accommodated in the signal processor 89. Similar applications can involve embedding the fiber section in buildings, bridges, and highways.

Figure 4:
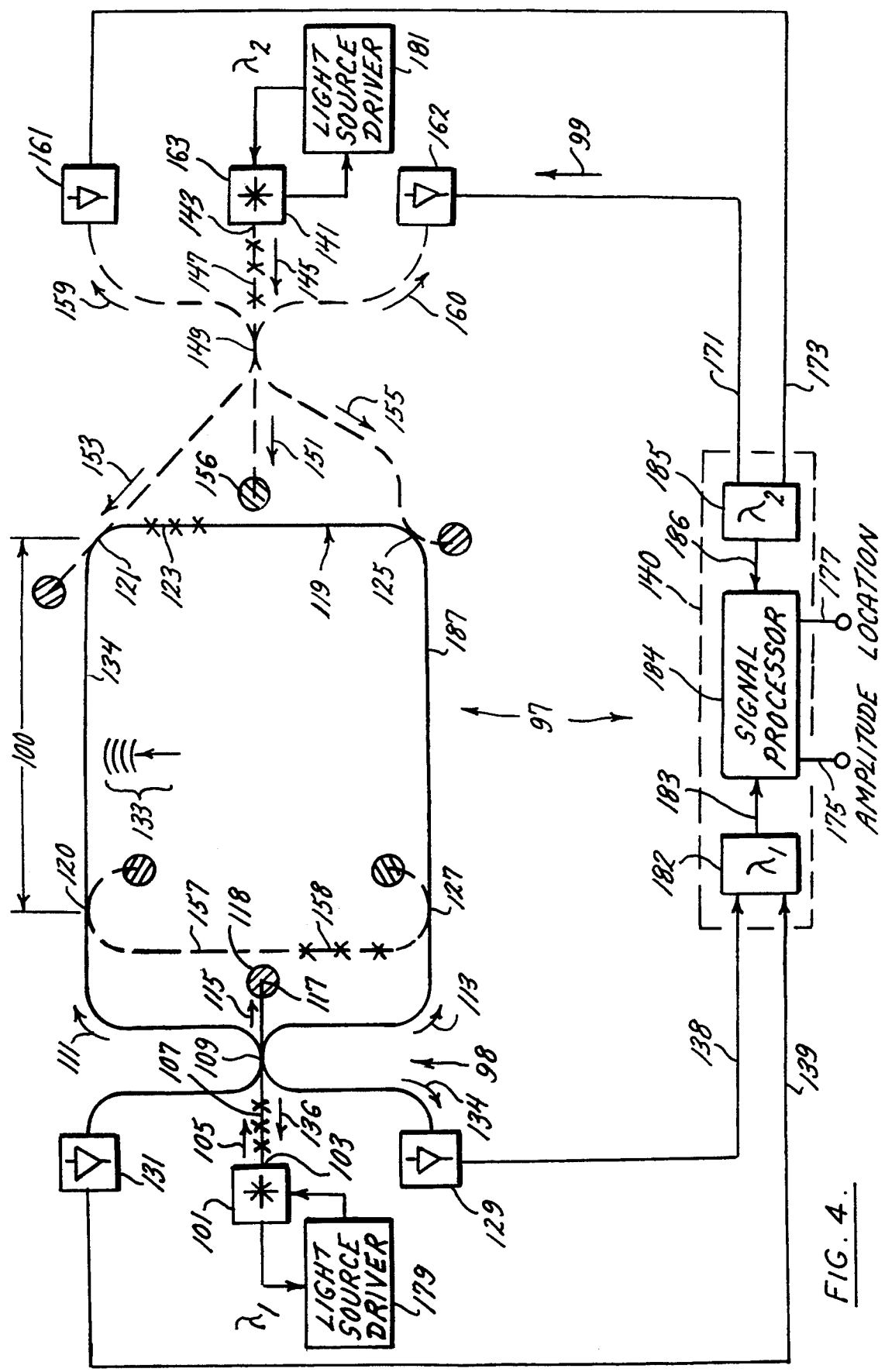
FIG. 4 is a diagram of the basic wavelength division multiplexed Sagnac distributed sensor of FIG. 1 using 3 by 3 couplers to optimize sensitivity to low level signal response.

For weak signals, Kjell Krakanes and Kjell Blotekjar (Optics Letters, Vol. 14, p. 1152, 1989) have demonstrated the ability to bias a Sagnac acoustic sensor system using a 3 by 3 coupler. Distributed Sagnac acoustic sensor 97 of FIG. 4 illustrates how 3 by 3 couplers can be substituted for the couplers 39 and 79 in sensor system 21. Like sensor system 21, sensor system 97 has a pair of sensors 98 and 99 that sense from different directions over a common optical fiber run 100. A light source 101 that operates about a center wavelength $\lambda_1$ couples light into the fiber end 103. The resulting light beam 105 then passes through a polarization scrambler 107 that acts to depolarize the light beam 105. The light beam 105 then enters the 3 by 3 coupler 109 where it is split into three light beams, a clockwise propagating light beam 111, a counterclockwise propagating light beam 113 and a light beam 115. The light beam 115 propagates to the fiber end 117, which includes an optical termination 118 to avoid back reflection into the system 97, and is lost. As an example, the termination 118 may be constructed by crushing the fiber end 117 and covering it with index matching cement (see E. Udd and R. E. Wagoner, Method of Terminating an Optical Fiber, U.S. Pat. No. 4,834,493, May 30, 1989 for additional examples). The light beam 111 propagates about the Sagnac loop 119 of the sensor 98 through wavelength division multiplexing elements 120 and 121 and the polarization scrambler 123, returning to the 3 by 3 coupler 109 via wavelength division multiplexing elements 125 and 127. The counterclockwise propagating beam 113 circulates through the Sagnac loop 119 in the opposite direction through the elements 127, 125, 123, and 120 before returning to the 3 by 3 coupler 109. When the two counter propagating light beams 111 and 113 return to the 3 by 3 coupler 109, they interfere with each other and depending upon their relative phase, will be directed toward a detector 129, a detector 131 or the light source 101 since 3 by 3 couplers with equal power splitting have the characteristic of shifting an input signal from output to output by 120° of phase. For a frequency dependent environmental signal 133 applied to the upper fiber leg 134 of the Sagnac loop 119, this will result in corresponding amplitude modulated signals 135, 136 and 137 being directed toward the detectors 129 and 131 and the light source 101 that are 120° out of phase with respect to each other (as opposed to 180° out of phase as is the case for a 2 by 2 coupler). The result is that the signals 135, 136 and 137 induced by the frequency dependent environmental effect 133 have significant first harmonic content that is fed as the outputs 138 and 139 from the detectors 129 and 131 into a signal processor 140.

The situation for the Sagnac interferometer sensor 99 supported by the light source 141 operating at the wavelength $\lambda_2$ is analogous. Light is coupled into the fiber end 143 and the resultant light beam 145 passes through a polarization scrambler 147. The light beam 145 is then split by a 3 by 3 coupler 149 into three light beams, beam 151, counterclockwise beam 153, and clockwise beam 155. The light beam 151 exits the fiber end 156 that is optimized to reduce back reflection and is lost. The clockwise counter propagating light beam 155 transverses the Sagnac loop 157 of the sensor 99, being cross-coupled by the wavelength division multiplexing elements 125 and 127 into polarization scrambler 158 and cross-coupled back toward the 3 by 3 central coupler 149 by the wavelength division multiplexing elements 120 and 121. The counterclockwise propagating light beam 153 traverses the Sagnac loop 158 in the opposite direction before returning to the 3 by 3 coupler 149. The light beams 153 and 155 interfere and output beams 159 and 160 that are 120° out of phase with respect to each other, are directed toward the output detectors 161 and 162. The outputs 171 and 173 of the detectors 161 and 162 are then directed into the signal processor 140 which in turn uses the sum and ratio of the signals from the two Sagnac interferometers 98 and 99, operating independently on wavelengths $\lambda_1$ and $\lambda_2$, respectively to calculate the amplitude output signal 175 of the environmental signal, and the location output signal 177. In order to assure that the light sources 101 and 141 do not add excess noise to the sensor system 97, closed loop light source drivers 179 and 181 may be employed as before.

A typical electronics support set forming the signal processor 140 is shown in FIG. 4. The outputs 138 and 139 from the detectors 129 and 131 are fed into a demodulator 182 for the Sagnac sensor 98 operating at $\lambda_1$. These outputs 138 and 139 are used to extract the amplitude and frequency content of the environmental signal 133 acting on the Sagnac sensor 98. This information is conveyed via the communication link 183 which could be a fiber optic or electrical link to a wavelength division multiplexed Sagnac distributed sensor signal processor 184. Similarly, the outputs 171 and 173 of the detectors 161 and 162 are fed into a demodulator 185 for the Sagnac sensor 99 operating at $\lambda_2$. These outputs 171 and 173 are used to extract the amplitude frequency content of the environmental signal 133 acting on the Sagnac sensor 99. This information is conveyed via the communication link 186 to the signal processor 184. By combining the signals delivered via the communication links 183 and 186, the signal processor 184 determines the signal on the amplitude output 175 and by taking the normalized ratio, the signal on the position output 177 is determined so that electrical signals representative of the location and amplitude of the environmental signal 133 are produced.

For many situations, it would be expected that the two fibers 134 and 187 used to form the Sagnac loops will be located in the same fiber cable or closely adjacent to each other where they are subjected to the same environmental signal 133. If the two fibers 134 and 187 are symmetrically located and are both responsive to the environmental signals 133, the Sagnac signals will to first order cancel these effects. To avoid this situation two approaches are shown in FIGS. 5 and 6.

FIG. 5 illustrates a modified sensor system 200 where one of the fibers 202 in a cable 204, connecting the two multiplexing elements 125 and 127, is acoustically isolated, by means of a coating 205 placed on it, relative to the acoustically sensitive fiber 206. In this manner, an acoustic signal 208 impinging on the fiber cable 204 will result in a greater optical path length change in the acoustically sensitized fiber 206 relative to the acoustically desensitized fiber 202 and a larger signal will be generated for the Sagnac distributed sensors 98 and 99 to process. As an example, the fiber 202 may be desensitized from acoustic sensitivity by coating it with a metal such as aluminum and the other fiber 206 may be optimized for acoustic sensitivity by using a soft compliant coating 210. These and other coatings, and processes for their application are commercially available.

FIG. 6 illustrates another modified sensor system 220 employing an alternative approach to the usage of fiber coatings. In system 220, offset fiber coils 222 and 224 are used to cause the two fibers 226 and 228 in the fiber cable 230 to be offset in distance by the length of the offset coils 222 and 224. The result is that the fiber cable 230 will be acoustically sensitive along its entire length. In general the offset coil length can be increased to increase sensitivity with a decrease in sensitivity occurring only when the characteristic frequency of the offset coil, c/Ln where c is the speed of light, L is length of the offset coil and n is the index of refraction, begins to be approached by the frequency of an environmental signal 232. Optional fiber coils 234 and 236 can be added between wavelength division multiplexing elements 120 and 127, and 121 and 125. If the coils 222, 224, 234 and 236 are about the same length as the fibers 226 and 228, there is no overlap in optical position between the fibers 226 and 228.

Figure 7:
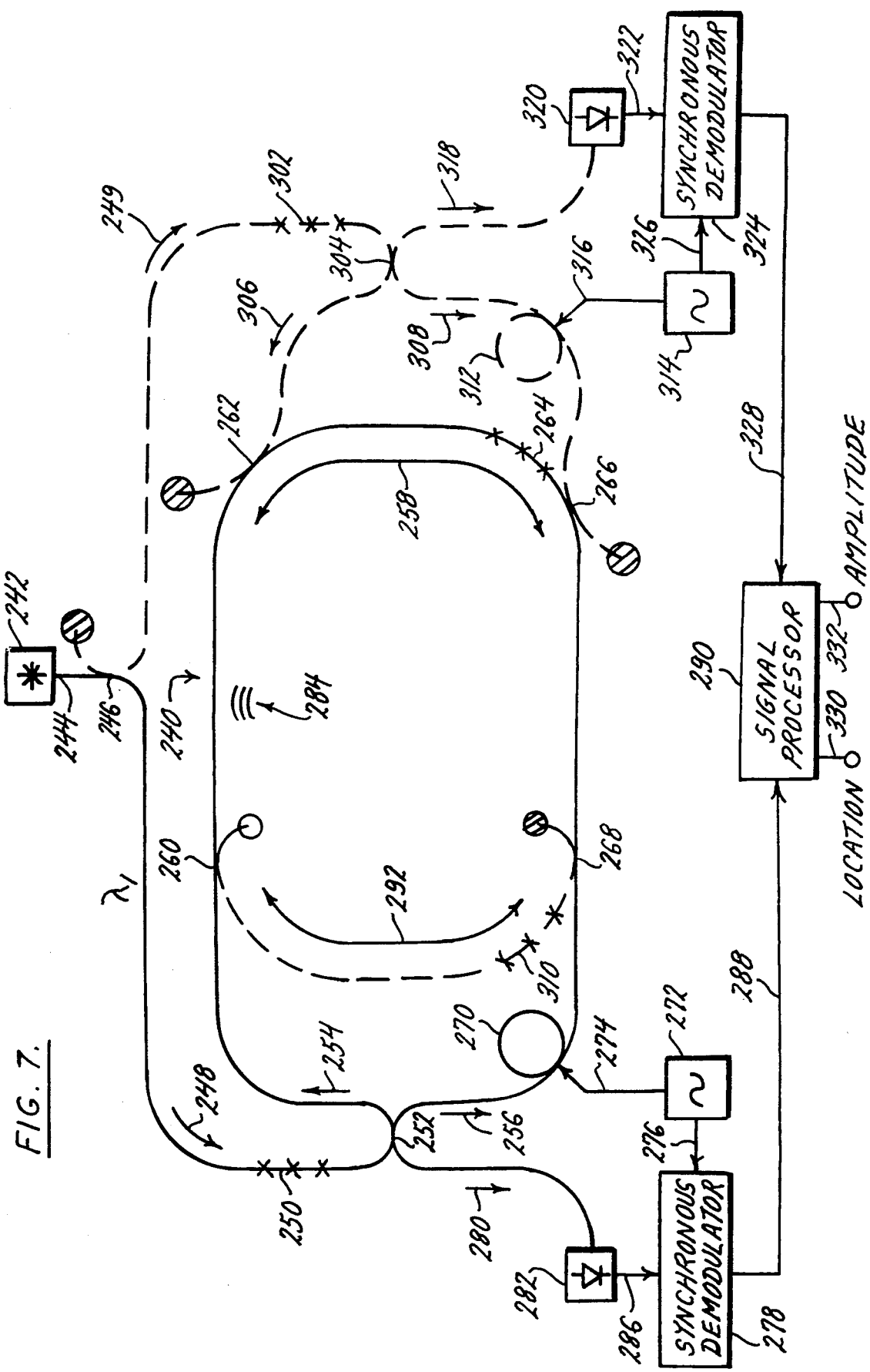
FIG. 7 is a diagram of a wavelength multiplexed distributed Sagnac sensor configured in a package with a sensitive fiber loop.

In addition to passive biasing as with the wavelength division multiplexed Sagnac distributed sensor system 220, it is possible to use dynamic biasing techniques such as those employed in association with the fiber optic gyros. FIG. 7 illustrates a wavelength division multiplexed Sagnac distributed sensor system 240 of this type. Although two separate light sources can be used as before, since the light source can be one of the most expensive components of the system 240, a single broadband light source 242, such as an LED operating over wavelengths $\lambda_1$ and $\lambda_2$ is positioned to couple light into the fiber end 244 of a multiplexing element 246. The multiplexing element 246 produces two resultant light beams, one 248 having a center wavelength $\lambda_1$ and the other 249 having a center wavelength $\lambda_2$. The resulting light beam 248 passes through a polarization scrambler 250 and is split by a central coupler 252 into counter propagating light beams 254 and 256 for travel around a Sagnac loop 258. The clockwise propagating light beam 254 passes wavelength division multiplexing elements 260 and 262 that are designed to pass light centered about the wavelength $\lambda_1$ straight through, to a polarization scrambler 264. The light beam 254 then passes through wavelength division multiplexing elements 266 and 268 to a phase modulator 270 and returns to the central coupler 252. The counterclockwise propagating light beam 256 traverses the Sagnac loop 258 through the phase modulator 270, the elements 268 and 266, the scrambler 264, and the elements 262 and 260 before returning to the central coupler 252. The phase modulator 270 is driven by an oscillator 272 with a sinusoidal output 274 to introduce an oscillating non-reciprocal phase shift between the counter propagating light beams 254 and 256. The oscillator 272 also provides the same sinusoidal signal as an output 276 to a synchronous demodulator 278.

When there is no frequency dependent environmental effect acting on the Sagnac loop 258, the two counter propagating light beams 254 and 256 mix and produce an amplitude modulated signal 280 that is directed to the output detector 282 and whose content is largely second and higher order even harmonics of the sinusoidal drive signal applied to the phase modulator 270. When a frequency dependent environmental signal 284 hits the Sagnac loop 258, the amplitude modulated signal 280 will contain first harmonics of the drive signal of the phase modulator 270. The amplitude of the first (and higher order odd) harmonic will be proportional to the amplitude of the environmental effect 284 and its location and the resultant electrical signal output 288 of the detector 282 is synchronously demodulated at the drive frequency of the sinusoidal oscillator 272. The resulting output 286 of the synchronous demodulator 278 is then fed into a signal processor 290. The second Sagnac loop 292 is supported by the light beam 249 operating about a center wavelength $\lambda_2$. The light beam 249 propagates through a polarization scrambler 302 and is split by a central coupler 304 into counter propagating light beams 306 and 308. The counterclockwise propagating light beam 306 is cross-coupled by the wavelength division multiplexing elements 262 and 260 to a polarization scrambler 310. The beam 306 then is cross-coupled by the wavelength division multiplexing elements 268 and 266 to a phase modulator 312 and returns to the central coupler 304. The clockwise propagating light beam 308 traverses the Sagnac loop 292 by means of the phase modulator 312, the elements 266 and 268, the scrambler 310, and the elements 260 and 262 before returning to the central coupler 304. An oscillator 314 applies a sinusoidal signal to the output 316 to the phase modulator 312. The action of the phase modulator 312 in turn is used to induce a sinusoidally varying phase shift between the counter propagating light beams 306 and 308 for demodulation purposes. When the two beams 306 and 308 recombine after circulating through the Sagnac loop 292, they interfere with each other and the resultant amplitude modulated signal 318 is directed toward an output detector 320. The output 322 from the detector 320 is directed to a synchronous demodulator 324 which in turn receives a sinusoidal drive signal on output 326 from the oscillator 314 for demodulation purposes. The resulting output 328 is directed to the signal processor 290, which uses the outputs 288 and 328 to produce a location output 330 and an amplitude output 332 of the environmental effect 284. The technique of using dynamic biasing and a single light source to implement a wavelength division multiplexed Sagnac distributed sensor may be applied in analogous fashion to all the embodiments described herein.

Thus there has been shown and described novel Sagnac distributed sensor systems which fulfill all the objects and advantages sought therefor. Many changes, modifications, variations, uses and applications of the subject invention will however will become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

I claim:

1. A distributed fiber optic sensor system for sensing environmental effects having:
 a first optical fiber having:
  a first end; and
  a second end;
 a second optical fiber having:
  a first end; and
  a second end;
 light source means that produce light in a first band and a second band;
 a first beamsplitter that splits said light in said first band into first and second light beams and connects said first and second light beams into said first ends of said first and second optical fibers respectively;
 first light transmission means connecting said first light beam from said first optical fiber second end to said second optical fiber second end and connecting said second light beam from said second optical fiber second end to said first optical fiber second end so that said second and first light beams traverse said first and second optical fibers respectively and recombine at said first beamsplitter to form a first recombined light beam;
 a second beamsplitter that splits said light in said second band into third and fourth light beams and connects said third and fourth light beams into said second ends of said first and second optical fibers respectively;
 second light transmission means connecting said third light beam from said first optical fiber first end to said second optical fiber first end and connecting said fourth light beam from said second optical fiber first end to said first optical fiber first end so that said fourth and third light beams traverse said first and second optical fibers respectively and recombine at said second beamsplitter to form a second recombined light beam;

a first detector connected to receive said first recombined light beam and to produce therefrom a first sensor output;

a second detector connected to receive said second recombined light beam and to produce therefrom a second sensor output; and signal processor means connected to said first and second sensor outputs to calculate the amplitude and position of any environmental effect on said first optical fiber.

2. The distributed fiber optic sensor system as defined in claim 1 wherein said first optical fiber includes:

a first sensing portion exposed to environmental effects; and a first spacing portion isolated from environmental effects positioned adjacent said first beamsplitter, whereby said second optical fiber is optically shifted from said sensing portion of said first optical fiber with respect to said first beamsplitter.

3. The distributed fiber optic sensor system as defined in claim 2 wherein said second optical fiber includes:

a second sensing portion exposed to environmental effects; and a second spacing portion isolated from environmental effects positioned adjacent said second beamsplitter, whereby said second optical fiber is optically shifted from said first optical fiber with respect to said second beamsplitter.

4. The distributed fiber optic sensor system as defined in claim 3 wherein said first and second spacing portions of said first and second optical fibers are essentially the same length.

5. The distributed fiber optic sensor system as defined in claim 1 further including:

a first phase shifter positioned between said first beamsplitter and said first end of one of said optical fibers; and a second phase shifter positioned between said second beamsplitter and said second end of one of said optical fibers.

6. The distributed fiber optic sensor system as defined in claim 5 further including:

oscillator means having:

a first oscillator output at a frequency higher than the frequencies in any environmental effect to be sensed and driving said first phase shifter therewith; and a second oscillator output at a frequency higher than the frequencies in any environmental effect to be sensed and driving said second phase shifter therewith, and wherein said signal processor means includes:

a first synchronous demodulator connected to receive said first oscillator output and said first sensor output to demodulate a first sensor signal out of said first sensor output;

a second synchronous demodulator connected to receive said second oscillator output and said second sensor output to demodulate a second sensor signal out of said first sensor output;

means to sum said first and second sensor signals to produce therefrom the amplitude of the environmental effect; and means to ratio said first and second sensor signals to produce therefrom the position of the environmental effect.

7. The distributed fiber optic sensor system as defined in claim 1 wherein said signal processor includes:

means to sum said first and second sensor outputs to produce therefrom an amplitude signal representative of the amplitude of the environmental effect; and means to ratio said first and second sensor outputs to produce therefrom a position signal representative of the position of the environmental effect.

8. The distributed fiber optic sensor system as defined in claim 1 wherein said light source means include:

a first light source that produces light in said first band into said first beamsplitter; and a second light source that produces light in said second band into said second beamsplitter.

9. The distributed fiber optic sensor system as defined in claim 8 wherein said light source means further include:

a first polarization scrambler positioned between said first light source and said first beamsplitter; and a second polarization scrambler positioned between said second light source and said second beamsplitter, whereby said first, second, third, and fourth light beams have scrambled polarity.

10. The distributed fiber optic sensor system as defined in claim 1 further including:

a third detector; and a fourth detector, wherein said first beamsplitter is a 3 by 3 optical fiber beamsplitter having:

a first side having:

a first arm connected to receive light in said first band from said light source means;

a second arm connected to conduct said first recombined light beam to said first detector; and a third arm connected to conduct a third recombined light beam to said third detector that produces therefrom a third sensor output; and a second side having:

a fourth arm in optical communication with said first end of said first optical fiber; and a fifth arm in optical communication with said first end of said second optical fiber, said first and second light beams recombining at said first 3 by 3 optical fiber beamsplitter to produce said first and third recombined light beams, and wherein said second beamsplitter is a 3 by 3 optical fiber beamsplitter having:

a first side having:

a first arm connected to receive light in said second band from said light source means;

a second arm connected to conduct said second recombined light beam to said second detector; and a third arm connected to conduct said a fourth recombined light beam to said fourth detector that produces therefrom a fourth sensor output; and a second side having:

a fourth arm in optical communication with said second end of said first optical fiber; and a fifth arm in optical communication with said second end of said second optical fiber, said third and fourth light beams recombining at said second 3 by 3 optical fiber beamsplitter to produce said second and fourth recombined light beams.

11. The distributed fiber optic sensor system as defined in claim 10 wherein said signal processor includes:

means to combine said first and third sensor outputs into a first sensor signal;

means to combine said second and fourth sensor outputs into a second sensor signal;

means to sum said first and second sensor signals to produce therefrom an amplitude signal representative of the amplitude of the environmental effects; and means to ratio said first and second sensor signals to produce therefrom a position signal representative of the position of the environmental effects.

12. The distributed fiber optic sensor system as defined in claim 10 wherein said light source means include:
- a first light source that produces light in said first band fed into said first 3 by 3 optical beamsplitter; and
- a second light source that produces light in said second band fed into said second 3 by 3 optical beamsplitter.

13. The distributed fiber optic sensor system as defined in claim 1 wherein said first light transmission means include:
- a first light transmission conduit having:
  - a first end; and
  - a second end;
- a first wavelength division multiplexing element having:
  - a first arm optically connected to said second end of said first optical fiber;
  - a second arm optically connected to said second beamsplitter, said first wavelength division multiplexing element passing light in said second band between said first arm and said second arm while blocking light in said first band therebetween; and
  - a third arm optically connected to said first end of said first light transmission conduit, said first wavelength division multiplexing element passing light in said first band between said first arm and said third arm while blocking light in said second band therebetween; and
- a second wavelength division multiplexing element having:
  - a first arm optically connected to said second end of said second optical fiber;
  - a second arm optically connected to said second beamsplitter, said second wavelength division multiplexing element passing light in said second band between said first arm and said second arm while blocking light in said first band therebetween; and
  - a third arm optically connected to said second end of said first light transmission conduit, said second wavelength division multiplexing element passing light in said first band between said first arm and said third arm while blocking light in said second band therebetween;
- a second light transmission conduit having:
  - a first end; and
  - a second end;
- a third wavelength division multiplexing element having:
  - a first arm optically connected to said first end of said first optical fiber;
  - a second arm optically connected to said first beamsplitter, said third wavelength division multiplexing element passing light in said first band between said first arm and said second arm while blocking light in said second band therebetween; and
  - a third arm optically connected to said first end of said second light transmission conduit, said third wavelength division multiplexing element passing light in said second band between said first arm and said third arm while blocking light in said first band therebetween; and
- a fourth wavelength division multiplexing element having:
  - a first arm optically connected to said first end of said second optical fiber;
  - a second arm optically connected to said first beamsplitter, said fourth wavelength division multiplexing element passing light in said first band between said first arm and said second arm while blocking light in said second band therebetween; and
  - a third arm optically connected to said second end of said second light transmission conduit, said fourth wavelength division multiplexing element passing light in said second band between said first arm and said third arm while blocking light in said first band therebetween.

14. The distributed fiber optic sensor system as defined in claim 13 wherein said first, second, third, and fourth wavelength division multiplexing elements are essentially identical in construction.

15. The distributed fiber optic sensor system as defined in claim 13 wherein said first and second light transmission conduits each include:
- a polarization scrambler therein.

16. The distributed fiber optic sensor system as defined in claim 13 wherein said light source means include:
- a first light source that produces light in said first band fed into said first 3 by 3 optical beamsplitter; and
- a second light source that produces light in said second band fed into said second 3 by 3 optical beamsplitter, and wherein said first and second light transmission conduits and said first and second light sources each include:
polarization scramblers therein.

17. The distributed fiber optic sensor system as defined in claim 13 wherein said light source means include:
- a first light source that produces light in said first band fed into said first 3 by 3 optical beamsplitter; and
- a second light source that produces light in said second band fed into said second 3 by 3 optical beamsplitter, and wherein said first and second light transmission conduits and said first and second light sources each include:
Lyot fiber polarization scramblers therein.

18. A sensor system including:
first optical fiber means having:
  a first end; and
  a second end;
second optical fiber means having:
  a first end; and
  a second end;
a first Sagnac interferometer sensor having:
  a first Sagnac loop that includes said first and second optical fiber means, said first Sagnac interferometer sensor producing a first interferometric output representative of any disturbance effecting at least said first optical fiber means;
a second Sagnac interferometer sensor spaced from said first Sagnac interferometer sensor and having:
a second Sagnac loop that includes said first and second fiber means, said second Sagnac interferometer sensor producing a second interferometric output representative of any disturbance effecting at least said first optical fiber means; and
signal processor means connected to said first and second Sagnac interferometer sensors to calculate the amplitude and position of a disturbance that occurs on at least said first optical fiber means from said first and second interferometric outputs.

19. The sensor system as defined in claim 18 wherein any sensed disturbance is a frequency dependent environmental effect.

20. The sensor system as defined in claim 18 wherein said sensor system is an intruder alarm subsystem in a secure communication system, said first and second optical fiber means being:
first and second optical fibers, at least portions thereof being positioned outside secure areas.

21. The sensor system as defined in claim 18 wherein the portions of said first and second optical fibers are in a single fiber cable, the portion of said second optical fiber in said single fiber cable being shielded from disturbances.

22. The sensor system as defined in claim 18 wherein said first fiber means include:
a first optical fiber portion that is exposed to disturbance, and wherein said second fiber means include:
a second optical fiber portion generally the same length as said first optical fiber portion that is exposed to disturbance, said first and second fiber portions being physically adjacent to each other, said system including:
means to offset the optical position of said first and second optical fibers portions from their physical positions.

23. The sensor system as defined in claim 22 wherein said first optical fiber portion has:
first and second end locations, wherein said second optical fiber portion has:
first and second end locations, and wherein said means to offset the optical position of said first and second optical fiber portions include:
at least two optical conduits isolated from disturbance, each being connected to an end location.

24. The sensor system as defined in claim 22 wherein said means to offset the optical position of said first and second optical fiber portions include:
at least four optical conduits isolated from disturbances, each of said optical conduits being connected to an end of said first and second optical portions.

25. The sensor system as defined in claim 24 wherein said first and second optical fiber portions and said four optical conduits have essentially the same length.

26. The sensor system as defined in claim 18 further including:
a first beamsplitter, wherein said first Sagnac loop extends from said first beamsplitter;
a second beamsplitter, wherein said second Sagnac loop extends from said second beamsplitter;
a first phase shifter positioned between said first beamsplitter and said first end of one of said optical fiber means; and
a second phase shifter positioned between said second fiber optic beamsplitter and said second end of one of said optical means.

27. The sensor system as defined in claim 26 further including:
oscillator means producing oscillator outputs, said oscillator outputs being fed to said first and second phase shifters, and wherein said signal processor means include:
a first synchronous demodulator connected to receive said oscillator outputs and said first interferometric output to demodulate a first sensor signal out of said first interferometric output;
a second synchronous demodulator connected to receive said oscillator outputs and said second interferometric output to demodulate a second sensor signal out of said second interferometric output;
means to sum said first and second sensor signals to produce therefrom the amplitude of the disturbance; and
means to ratio said first and second sensor signals to produce therefrom the position of the disturbance.

28. The sensor system as defined in claim 18 wherein said signal processor means include:
means to sum said first and second interferometric outputs to produce therefrom amplitude signals representative of the amplitude of the disturbance; and
means to ratio said first and second interferometric outputs to produce therefrom a position signal representative of the position of the disturbance.

29. The sensor system as defined in claim 18 further including light source means that produce a light to said first Sagnac loop in a first frequency band, and that produce light to said second Sagnac loop in a second frequency band different from said first frequency band.

30. The sensor system as defined in claim 29 wherein said light source means include:
a first light source that produces said light in said first band; and
a second light source that produces light in said second band.

31. The sensor system as defined in claim 29 wherein said light source means include:
a light source that produces said light in predetermined first and second frequency bands; and
light feeding means to feed light in said first frequency band into said first Sagnac loop and to feed light in said second frequency band into said second Sagnac loop.

32. The sensor system as defined in claim 31 wherein said light feeding means include:
a wavelength division multiplexing element.

33. The sensor system as defined in claim 29 wherein said light source means further include:
means to scramble the polarization of the light produced thereby.

34. The sensor system as defined in claim 33 wherein each of said Sagnac loops includes:
means to scramble the polarization of light therein.

35. The sensor system as defined in claim 29 wherein said light source means include:
intensity maintenance means associated therewith.

36. The sensor system as defined in claim 18 further including:

a first 3 by 3 beamsplitter, wherein said first Sagnac loop extends from said first 3 by 3 beamsplitter, said first 3 by 3 beamsplitter producing said first interferometric output and a third interferometric output;

a second 3 by 3 beamsplitter, wherein said second Sagnac loop extends from said second 3 by 3 beamsplitter, said second 3 by 3 beamsplitter producing said second interferometric output and a fourth interferometric output, said signal processor means also using said third and fourth interferometric outputs to calculate the amplitude and position of a disturbance that occurs on at least said first optical fiber means.

37. The sensor system as defined in claim 36 wherein said signal processor means include:
means to combine said first and third interferometric outputs into a first sensor signal;
means to combine said second and fourth sensor interferometric outputs into a second sensor signal;
means to sum said first and second sensor signals to produce therefrom an amplitude signal representative of the amplitude of the disturbance; and
means to ratio said first and second sensor signals to produce therefrom a position signal representative of the position of the disturbance.

38. The sensor system as defined in claim 18 wherein said first optical fiber means include:
an optical fiber imbedded in a structure to sense strains therein.

39. The sensor system as defined in claim 18 wherein said first and second optical fiber means are portions of an optical system, whereby disturbance of the optical system can be sensed thereby.

40. A distributed sensor system including:
a first optical fiber;
a first Sagnac interferometer including:
a first Sagnac loop in which said first optical fiber is located;
a second Sagnac interferometer including:
a second Sagnac loop in which said first optical fiber is located, said first and second Sagnac loops being positioned to sense from opposite directions along said first optical fiber, the position and amplitude of environmental effects indicative of a disturbance of said first optical fiber.

41. The distributed sensor system as defined in claim 40 wherein said first and second Sagnac interferometers operate in separate optical frequency bands.

42. The distributed sensor system as defined in claim 40 wherein said first optical fiber is acoustically enhanced, with respect to the remainder of said first and second Sagnac loops.

43. The distributed sensor system as defined in claim 40 wherein said first optical fiber is located in a different physical area than the remainder of said first and second Sagnac loops so that a particular disturbance can occur only to said first optical fiber.

44. The distributed sensor system as defined in claim 40 including:
a second optical fiber, wherein said first Sagnac interferometer includes:
a first beamsplitter
a first light source feeding a first sensor light beam into said first beamsplitter, which first sensor light beam is split by said first beamsplitter into second and third sensor light beams that are transmitted to said first and second optical fibers respectively for traverse there through;
first means coupling said second and third sensor light beams from said first and second optical fibers to said second and first optical fibers respectively for traverse there through and back to said first beamsplitter for combination into a fourth light beam; and
a first detector positioned to receive said fourth light beam from said first beamsplitter and to produce therefrom a first detector output whose intensity is an indication of the position and amount of disturbance in said first and second optical fibers, and wherein said second Sagnac interferometer includes:
a second beamsplitter;
a second light source feeding a fifth sensor light beam into said second beamsplitter, which fifth sensor light beam is split by said second beamsplitter into sixth and seventh sensor light beams that are transmitted to said first and second optical fibers respectively for traverse there through;
second means coupling said sixth and seventh sensor light beams from said first and second optical fibers first and second optical fibers to said second and first optical fibers respectively for traverse there through and back to said second beamsplitter for combination into an eighth light beam; and
a second detector positioned to receive said eighth light beam from said second beamsplitter and produce therefrom a second detector output whose intensity is an indication of the position and amount of disturbance in said first and second optical fibers, said distributed sensor system further including:
a signal processor connected to said first and second detector outputs to produce therefrom a position output and a amplitude output indicative of the position and amplitude of disturbance in said first and second optical fibers.

45. The distributed sensor system as defined in claim 44 wherein said first and second optical fibers are fiber portions located side by side in a single fiber cable, said first optical fiber being covered with a disturbance enhancing coating, and said second optical fiber being covered with disturbance shielding.

46. The distributed sensor system as defined in claim 44 wherein said first and second optical fibers are physically separated so that a particular disturbance can occur only on one of said first or second optical fibers.

47. The distributed sensor system as defined in claim 40 including:
a second optical fiber, wherein said first and second optical fibers have:
first and second opposite sides, and wherein said first Sagnac interferometer includes:
a first central beamsplitter at least having:
first, second, third, fourth, and fifth arms;
a first light source feeding a first sensor light beam into said first arm, which first sensor light beam is split by said first central beamsplitter into second and third sensor light beams traveling on said second and third arms respectively;
first means coupling said second and third sensor light beams from said second and third arms into said first and second optical fibers at said first sides thereof for traverse there through;

second means coupling said second and third sensor light beams out of said first and second optical fibers and into said second and first optical fibers respectively at said second sides thereof, said second and third sensor light beams after re-traversing said second and first optical fibers and said first means recombining on said first central beamsplitter to form a fourth sensor light beam on said fourth arm and a fifth sensor light beam on said fifth arm;

a first detector positioned to receive said fourth sensor light beam from said fourth arm and produce therefrom a first detector output whose intensity is an indication of the position and amount of disturbance in said first and second optical fibers; and a second detector positioned to receive said fifth sensor light beam from said fifth arm and to produce therefrom a second detector output whose intensity is an indication of the position and amount of disturbance in said first and second optical fibers, and wherein said second Sagnac interferometer includes:

a second central beamsplitter at least having: sixth, seventh, eighth, ninth, and tenth arms;

a second light source feeding a sixth sensor light beam into said sixth arm, which sixth sensor light beam is split by said second central beamsplitter into seventh and eighth sensor light beams traveling on said seventh and eighth arms respectively;

third means coupling said seventh and eighth sensor light beams from said seventh and eighth arms into said first and second optical fibers at said second sides thereof for traverse there through;

fourth means coupling said seventh and eighth sensor light beams out of said first and second optical fibers at said first sides thereof, said seventh and eighth sensor light beams after re-traversing said second and first optical fibers and said third means recombining on said second central beamsplitter to form a ninth sensor light beam on said ninth arm and a tenth sensor light beam on said tenth arm;

a third detector positioned to receive said ninth sensor light beam from said ninth arm and produce therefrom a third detector output whose intensity is an indication of the position and amount of disturbance in said first and second optical fibers; and a fourth detector positioned to receive said tenth sensor light beam from said tenth arm and produce therefrom a fourth detector output whose intensity is an indication of the position and amount of disturbance in said first and second optical fibers, said distributed sensor system further including:

signal processor means connected to said first, second, third, and fourth detector outputs to produce therefrom a position output and a amplitude output indicative of the position and amplitude of any disturbance in said first and second optical fibers.

48. The distributed sensor system as defined in claim 40 including:
light source means; and
a second optical fiber located in said first and second Sagnac loops, wherein said first and second Sagnac interferometers each have:

a 3 by 3 coupler connected to receive light from said light source means and to provide the light to said first and second optical fibers;

bypass means to transmit light around said 3 by 3 coupler of said other of said first and second Sagnac interferometers so that the light returns to said 3 by 3 coupler from which it came; and a pair of detectors positioned to receive the returning light and to produce first and second output signals therefrom, said distributed sensor system further including:

computational means connected to receive said first and second output signals from said first and second Sagnac interferometers to produce therefrom a signal indicative of a disturbance of said first optical fiber.

49. A sensor system including:
a sensing element exposed to environmental effects over a predetermined distance;
a first Sagnac interferometer including:
a first Sagnac loop in which said sensing element is located;
a second Sagnac interferometer having:
a second Sagnac loop having at least said sensing element in common with said first Sagnac loop, said first and second Sagnac interferometers being differently located with respect to said sensing element to sense the position along said predetermined distance and the amplitude of environmental effects affecting said sensing element.

50. The sensor system as defined in claim 49 wherein said sensing element is at least a portion of an optical fiber.

51. A sensor system including:
an elongate sensing element exposed to effects capable of at least momentarily changing the light transmission characteristics of said elongate sensing element;
a first Sagnac interferometer producing a first output representative of effects to which said elongate sensing element is exposed and including:
a first Sagnac loop in which said elongate sensing element is located;
a second Sagnac interferometer producing a second output representative of effects to which said elongate sensing element is exposed and including:
a second Sagnac loop different than said first Sagnac loop in which at least said elongate sensing element of said first Sagnac loop is also located; and
means to receive said first and second outputs and produce therefrom at least a third output indicative of effects changing the light transmission characteristics of said elongate sensing element.

52. A sensor system including:
an elongate sensing element exposed to a periodic environmental effect;
a first interferometer including:
a first Sagnac loop in which said elongate sensing element is located, said first interferometer producing a first output representative of the periodic environmental effect;
a second interferometer including:
a second Sagnac loop in which said elongate sensing element is also located, said second interferometer producing a second output representative of the periodic environmental effect; and
means to receive said first and second outputs and produce therefrom at least a third output indicative of the position of the periodic environmental effect along said elongate sensing element.

* * * * *